US009514229B2

(12) United States Patent
Li et al.

(10) Patent No.: US 9,514,229 B2
(45) Date of Patent: Dec. 6, 2016

(54) SYSTEM AND METHOD FOR QUALITY OF EXPERIENCE AWARE MEDIA SEARCH AND RECOMMENDATION WITH UNIFIED PORTAL

(71) Applicant: Futurewei Technologies, Inc., Plano, TX (US)

(72) Inventors: Hongbing Li, Skillman, NJ (US); Yue Chen, Freemont, CA (US); Hong Heather Yu, West Windsor, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 215 days.

(21) Appl. No.: 13/862,328

(22) Filed: Apr. 12, 2013

(65) Prior Publication Data

US 2013/0275419 A1 Oct. 17, 2013

Related U.S. Application Data (60) Provisional application No. 61/623,346, filed on Apr. 12, 2012.

(51) Int. Cl.
*G06F 7/00* (2006.01)
*G06F 17/30* (2006.01)
(Continued)

(52) U.S. Cl.
CPC ... *G06F 17/30867* (2013.01); *G06F 17/30029* (2013.01); *H04L 67/02* (2013.01); *H04L 67/2819* (2013.01); *H04L 67/306* (2013.01); *H04N 21/25833* (2013.01); *H04N 21/25891* (2013.01); *H04N 21/4516* (2013.01); *H04N 21/4532* (2013.01); *H04N 21/4622* (2013.01);
(Continued)

(58) Field of Classification Search
None
See application file for complete search history.

(56) References Cited

U.S. PATENT DOCUMENTS 5,875,300 A * 2/1999 Kamel et al. ............... 709/219
2007/0208688 A1 9/2007 Bandhole et al.
(Continued)

FOREIGN PATENT DOCUMENTS

WO 2008057345 A2 5/2008
WO 2011030128 A1 3/2011

OTHER PUBLICATIONS

Foreign Communication From a Counterpart Application, PCT Application No. PCT/US2013/036491, International Search Report dated Jul. 17, 2013, 6 pages.
(Continued)

*Primary Examiner* — Thu Nga Nguyen
(74) *Attorney, Agent, or Firm* — Conley Rose, P.C.; Grant Rodolph; William H. Dietrich (57) ABSTRACT

A network element comprising a processor configured to receive a plurality of search responses from a plurality of media content service providers associated with a search request triggered by the search request, and rank the search responses based on maximizing an end user's quality of experience (QoE). Included is a network element comprising a processor configured to receive a plurality of media content from a plurality of media content service providers, store the plurality of media content for a plurality of end users, receive a media content search request from a user terminal, rank the media content based upon maximizing the user terminal's QoE. Also included is a method comprising requesting media content from a plurality of media content service providers on behalf of a user terminal, receiving data associated with the media content from the plurality of media content service providers and aggregating the media content data.

15 Claims, 4 Drawing Sheets

(51) Int. Cl.
   *H04N 21/258* (2011.01)
   *H04N 21/45* (2011.01)
   *H04N 21/462* (2011.01)
   *H04N 21/482* (2011.01)
   *H04L 29/08* (2006.01)
(52) U.S. Cl.
   CPC ...... *H04N 21/4826* (2013.01); *H04N 21/4828* (2013.01)

(56) References Cited

U.S. PATENT DOCUMENTS

2007/0211158 A1   9/2007   Icho
2008/0288460 A1   11/2008  Poniatowski et al.
2008/0298370 A1*  12/2008  Yoshimoto et al. ...... 370/395.31
2012/0007200 A1*  1/2012   Lee et al. ...................... 257/432
2012/0157713 A1*  6/2012   Kim et al. ..................... 564/414
2012/0304233 A1*  11/2012  Roberts ............ H04N 21/23113
                                                              725/82
2013/0246631 A1*  9/2013   Gonzales et al. ............. 709/227

OTHER PUBLICATIONS

Foreign Communication From a Counterpart Application, PCT Application No. PCT/US2013/036491, Written Opinion dated Jul. 17, 2013, 8 pages.

\* cited by examiner

SYSTEM AND METHOD FOR QUALITY OF EXPERIENCE AWARE MEDIA SEARCH AND RECOMMENDATION WITH UNIFIED PORTAL

CROSS-REFERENCE TO RELATED APPLICATIONS

The present application claims priority to U.S. Provisional Patent Application 61/623,346, filed Apr. 12, 2012 by Hongbing Li, et al., and entitled "System and Method for Quality of Experience Aware Media Search and Recommendation with Unified Portal," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Internet media (e.g. video or audio) may enhance an end user's entertainment experience by providing a wider selection of media content. Internet video may substantially broaden the scope of media content available to an end user. There is virtually unlimited media content available through the Internet, such as professional media content (e.g. Netflix™ Hulu™, Amazon™ instant video, and YouTube™ movies) as well as user generated content (e.g. YouTube™ and YourListen™). End users may stream media content on a television (TV), a personal computer (PC), a laptop, a smartphone, a tablet computer or any other suitable equipment. Each of these terminal devices an end user may use has its own dynamic terminal capabilities and network bandwidths. Also, the media content may be available through a variety of fee structure options, such as free (e.g. completely free, free with advertisements (ads) inserted into the media content playback, and free with ads surrounding the media content playback), by subscription, or by pay-per-view (PPV). An end user may have access to the same content from multiple service providers and may be required to manually select their desired content without any recommendations. However, generally an end user may have difficulty with locating the right media content that will maximize the end user's quality of experience (QoE) in this world of effectively unlimited media content through the Internet.

SUMMARY

In one embodiment, the disclosure includes a network element comprising a processor configured to receive a plurality of search responses from a plurality of media content service providers, wherein the search responses identify available media associated with a search request, and wherein the search responses is triggered by the search request distributed to the plurality of media content service providers, and rank the search responses based on maximizing an end user's quality of experience.

In another embodiment, the disclosure includes a network element comprising a processor configured to receive a plurality of media content from a plurality of media content service providers, store the plurality of media content for a plurality of end users, receive a media content search request from a user terminal and rank the media content based upon maximizing the user terminal's quality of experience.

In another embodiment, the disclosure includes a method comprising requesting media content from a plurality of media content service providers on behalf of a user terminal, receiving search responses and data associated with the media content from the plurality of media content service providers, and aggregating the search responses.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system, apparatus, and/or a method for a telecom network to filter, rank, and/or aggregate responses to an end user's media content search request from a plurality of service providers. Such responses may be used to enhance the end user's QoE. The media content search request originates with an end user submission to a telecom network that in turn distributes the media content search request to a plurality of service providers. QoE may be based upon any combination of factors, such as key word matching, media popularity among other end users, media genre, an end user's terminal capability, available network bandwidth, and/or a requested media monetization method. A unified portal architecture may be employed to manage QoE enhancing functions. A unified portal architecture may comprise a search request collecting function, an end user information function, a search request distribution function, a service provider response collecting function, and a service provider response filtering, ranking, and/or aggregating function. A telecom operator network may also enhance an end user's QoE by implementing a telecom operator content delivery network (CDN) within a telecom network. A telecom operator network may also enhance an end user's QoE by offering end user's a pay-per-use temporary boost in network bandwidth allocated to the end user to support streaming media content that may require greater network bandwidth.

Figure 1:
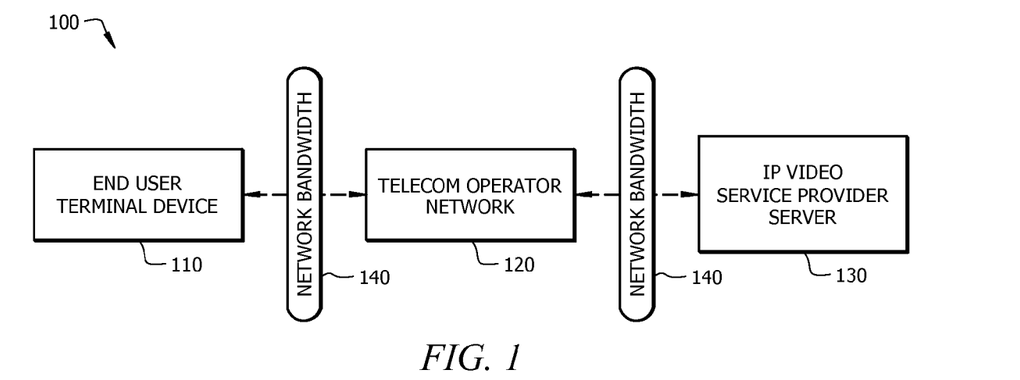
FIG. 1 is a schematic diagram of an embodiment of a media content distribution architecture.

FIG. 1 is a schematic diagram of an embodiment of a media content distribution architecture 100. An end user searching for a desired media content may submit a search request through an end user terminal device 110 to a service provider's search engine, which may be positioned on an internet protocol (IP) service provider server 130. In architecture 100, an end user may submit multiple search requests to a plurality of service provider servers 130. The search requests may be routed from the end user terminal device 110 to the service provider servers 130 via network bandwidth 140 provided by a telecom operator network 120. In response to each search request, an end user may receive a plurality of responses from service provider servers 130. An end user may then review all of the search responses and may decide which search response may be optimal. In architecture 100, a telecom operator may participate in the Internet media value chain by providing the network bandwidth 140 for the end user terminal device 110 and the service provider servers 130 through the telecom operator network 120.

An end user may submit search requests via an end user terminal device 110. An end user terminal device 110 may take many forms (e.g. an IP TV set top box, a personal computer, a laptop, a smart phone, etc.). Each form of end user terminal device 110 may have unique capabilities and/or limitations. For example, an end user terminal device 100 capabilities and/or limitations may comprise a device processing speed, an available memory, an available screen size, an available and/or maximum bandwidth, and/or an available screen resolution, etc. As such, media content may display differently based on the differing capabilities of the end user terminal device 110 employed. For example, low resolution content may display poorly on high resolution terminal devices 100. As another example, poor bandwidth may result in long buffering times for high resolution media content.

A telecom operator network 120 may provide network bandwidth 140 for an end user terminal device 110 and a service provider server 130. A telecom operator network 120 may comprise transceivers, servers, switching equipment, and/or an interconnect medium (e.g. twisted pair/coaxial cables, fiber optics, and/or wireless linkage). An end user and a service provider may contract with a telecom operator to receive network bandwidth 140 that may enable internet connectivity.

A service provider server 130 may host a catalog of media content and/or provide a searching capability of the catalog of media content over the Internet. Media content may comprise information produced and/or stored by a content provider (e.g. movie studios, recording studios, publishers, etc.) for distribution to a plurality of end users (e.g. via end user terminal device 110). Media content may take many forms including: music, movies, TV shows, magazines, video games, etc. A service provider may offer a plurality of monetization methods (e.g. subscription-based, pay-per-use, free with ads, free without ads, etc.). Also, a service provider server 130 may offer a variety of media content (e.g. high definition (HD) content, standard definition (SD) content, media content with variable bit rates and media content with multiple resolutions). A service provider server 130 may comprise a virtual machine (VM), a single server, and/or a plurality of servers and may be positioned in a data center.

Some service providers may also implement a CDN to improve an end user's QoE while some service providers may not.

Architecture 100 may comprise shortcomings for the various parties involved. Telecom operators may desire to expand their presence in the Internet media value chain beyond providing the network bandwidth 140. End users may desire to simplify the process of submitting requests for media content, may want recommendations for deciding among the vast selection of Internet media content, and may appreciate assistance with choosing a media content that enhances QoE. Network traffic based end users (e.g. using mobile network services), may also be reluctant to stream high bandwidth requiring media as their network traffic charges may increase substantially.

Figure 2:
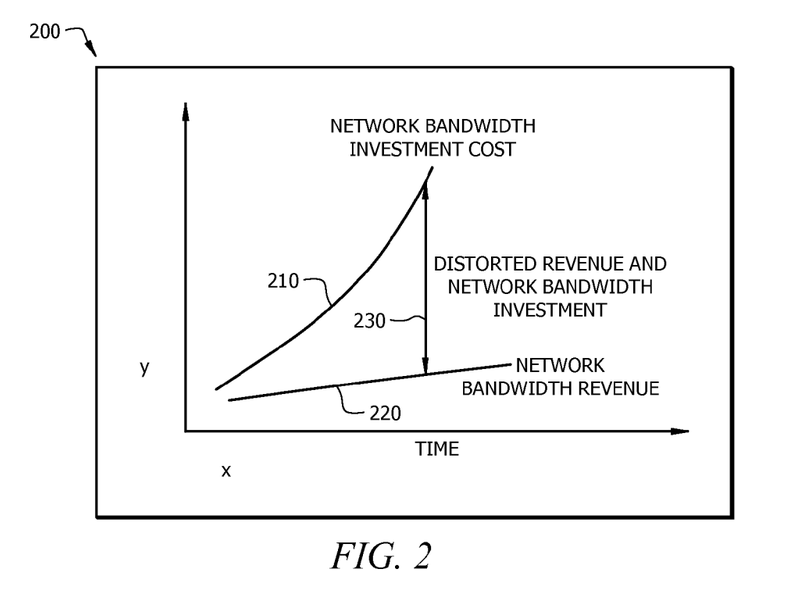
FIG. 2 is a graph of an embodiment of network bandwidth investment cost versus network bandwidth revenue over time.

FIG. 2 illustrates an embodiment of a graph 200 of network bandwidth investment cost 210 versus network bandwidth revenue 220 over time, such as may occur in architecture 100. The graph 200 depicts a widening gap between an increasing demand for network bandwidth investment cost 210 versus network bandwidth revenue 220 over time. The x axis of the graph 200 may correspond to a linear progression of time. The y axis of the graph 200 may correspond to units of capital (e.g. cost and/or revenue).

As end users increasingly access Internet media content (e.g. via user terminal device 110) a corresponding increase in network bandwidth investment costs 210 may be needed to keep pace with end users usage. An explosive growth of video traffic may not correspond with a linear network bandwidth revenue 220 growth, such as telecom operators may have previously experienced. Telecom operators may need to expend greater resources to upgrade networks (e.g. telecom operator network 120) in order to keep pace with an increasing network bandwidth demand. Resource expenditures may be needed to upgrade network components, such as transceivers, servers, switching equipment, and interconnect medium (e.g. twisted pair/coaxial cables, fiber optics, or wireless linkage), which may comprise a telecom operator's network (e.g. telecom operator network 120). Despite an increase in resource expenditures associated with network bandwidth investment cost 210, a telecom operator employing architecture 100 may not earn a proportional increase in network bandwidth revenue 220. In architecture 100, telecom operators may only charge a network access fee from end users and service providers (e.g. for network bandwidth 140). Thus, a telecom operator employing architecture 100 by providing network bandwidth 140 may bear increased network bandwidth investment costs 210, which may not be offset by increased network bandwidth revenue 220. As a result, a telecom operator employing architecture 100 may experience a widening gap 230 between network bandwidth investment 210 and network bandwidth revenue 220.

Figure 3:
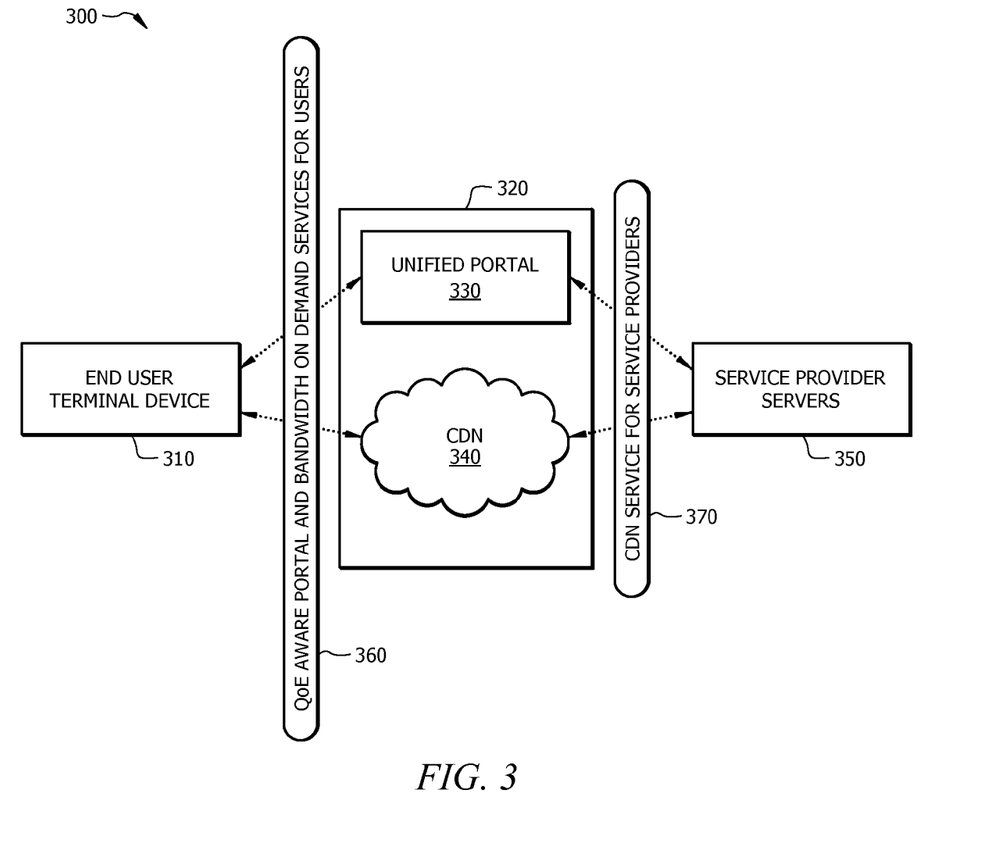
FIG. 3 is a schematic diagram of an embodiment of another media content distribution architecture.

FIG. 3 is a schematic diagram of an embodiment of another media content distribution architecture 300. Architecture 300 may comprise an end user terminal device 310, a telecom operator network 320, and a plurality of service provider servers 350, which may be similar to end user terminal device 110, telecom operator network 120, and service provider server 130, respectively. In architecture 300, a telecom operator network 320 may further comprise a unified portal 330 and a telecom CDN 340. An end user terminal device 310 searching for media content may submit a media content search request to a service provider server 350 via unified portal 330. Unified portal 330 may submit the media content search request to a plurality service provider servers 350, receive responses from the service provider servers 350, aggregate, filter and/or rank the responses based on QoE, and return results to the end user terminal device 310. QoE may be a subjective measure of an end user's experience with a service. QoE may be measured by various metrics such as by comparing media content delivered to an end user with the technical specifications of the end user's terminal device and/or network connection. QoE may also be measured by comparing the relevance of the media content returned to an associated request. Telecom CDN 340 may store media content for service provider servers 350 for faster delivery to an end user terminal device 310. Architecture 300 may also comprise components to support CDN service for service provider servers 350.

A telecom operator network 320 may process a media content search request via a unified portal 330. The telecom operator network 320 may then route the media content search request to a plurality of service provider servers 350. The unified portal 330 may aggregate service provider responses to a media content search request from an end user terminal 310. The unified portal 330 may then rank aggregated service provider responses based on maximizing an end user's QoE. In an embodiment, this ranking may be based upon any combination of factors, such as key word matching, media popularity among other end users, media genre, an end user's terminal capability, available network bandwidth, and/or a requested media monetization method. Thus, a telecom operator may offer an end user a value added service of sorting through a plurality of service provider responses to maximize the end user's QoE. In contrast, an end user terminal 110 may be required to sort through service provider server 130 responses without guidance.

The telecom operator network 320 may also offer an end user an additional value added service comprising a pay-per-use temporary boost in their available network bandwidth. Thus, an end user terminal 310 who may not always need a higher network bandwidth than their subscription rate may purchase a temporary boost to accommodate higher bandwidth requiring media. For example, an end user terminal 310 may wish to view a HD movie that their subscription rate network bandwidth may not be able to accommodate and components 360 may be employed to provide the temporary boost. Components 360 may comprise switches, routers, bridges, and/or any additional hardware/software combination necessary to enable a temporary boost in an end user's available network bandwidth. In contrast, an end user terminal device 110 may either subscribe to a higher subscription rate with a telecom operator for a permanent network bandwidth increase or stream media that may require a lower bandwidth. In an alternative embodiment additional bandwidth charges may be bundled into a media content charge. In this embodiment, end users may pay a download fee to download media content to their end user terminal device 310. A charge for the additional network bandwidth may be embedded in the download fee and may be passed along from the service provider server 350 to the telecom operator network 320. Components 360 may be controlled by the telecom operator network 320, unified portal 330, telecom CDN 340, and/or combinations thereof.

A telecom operator network 320 may also offer a telecom CDN 340 service for service provider servers 350 and/or an end user terminal device 310. A telecom CDN may comprise a media content distribution network that may be built on an internet protocol (IP) network, and may be in the form of a central-edge server distribution. Edge servers may be disposed in an area or network where end user accesses may be relatively intensive, and a central server may store media content. The central server may distribute a portion of the media content to respective edge servers via a backbone network according to a distribution policy. Media content may then be routed to end users via edge servers. For example, popular media content may be distributed to edge servers, while less popular media content may remain on a central server. The same media content may be stored on multiple edge servers. An end user submitting a media content search request may be directed to an operational edge server that may be closest to the end user by means of a global load balancing technique. The edge server may directly respond to the end user's media content search request. If the edge server does not have the media content requested by the end user, such edge server may automatically request the corresponding media content from a central server based on a telecom CDN 340 configuration and provide the requested media content to the end user. A telecom operator network 320 may also comprise a CDN service for service providers 370 to provide a connection network between service provider servers 350 and a telecom CDN 340. A CDN service for service providers 370 may comprise switches, routers, bridges, and/or any additional hardware/software combination necessary to transport data between a telecom CDN 340 and service provider servers 350.

In an embodiment, end user terminal 310 may submit a media content search request to a plurality of service provider servers 350 by submitting a single media content search request to a telecom network 320 via a unified portal 330. The unified portal 330 may then route the media content search request to a plurality of service provider servers 350. Architecture 300 may offer components 360 to enable a temporary boost in an end user's available network bandwidth as an additional service to end users. Also, architecture 300 may offer a telecom CDN 340 to service provider servers 350 that may function in a similar manner to a CDN edge server. Thus, a telecom operator network 320 may directly participate in an Internet media value chain.

It should be understood that telecom operator networks 120 and 320 merely serve as illustrative examples of media content distribution networks. Depending on the application, any other number of networks may be used within the scope of this disclosure. Architectures 100 and 300 may be adapted for other network forms. For example, multiple system operator (MSO) networks that operate multiple cable television systems. MSO networks may comprise passive optical networks (PONs) and Ethernet PON over Coaxial (EPoC) networks that may similarly provide network bandwidth.

Figure 4:
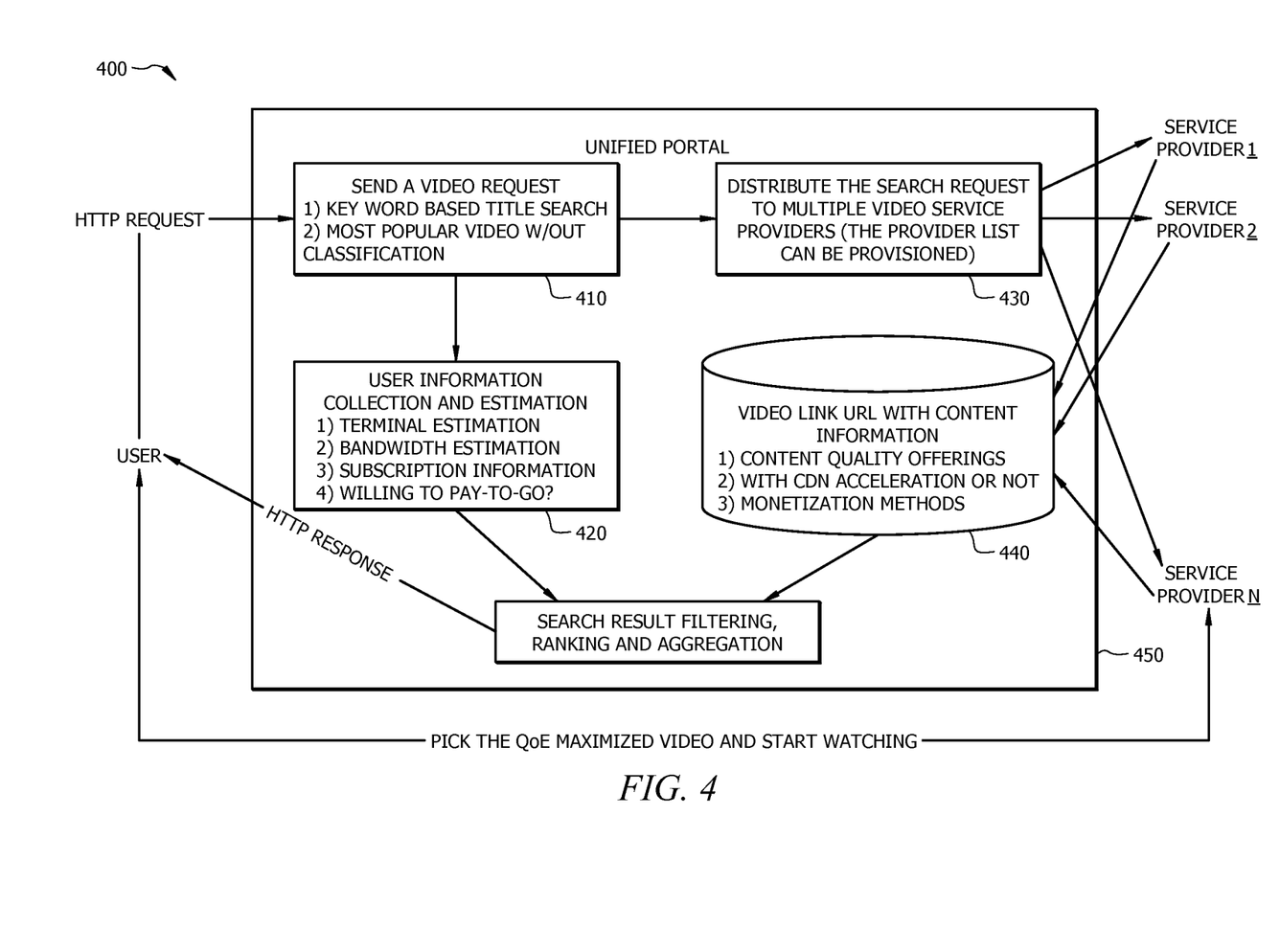
FIG. 4 is a schematic diagram of an embodiment of a unified portal.

FIG. 4 is a schematic diagram of an embodiment of a unified portal 400. A unified portal 400 may be implemented by a network element (NE) and/or by a plurality of NEs that act in combination to permit similar functionality. A unified portal 400 may be substantially similar to unified portal 330. A unified portal 400 may comprise a search request collecting function 410, an end user information function 420, a search request distribution function 430, a service provider response collecting function 440, and a service provider response filtering, ranking, and/or aggregating function 450. A unified portal 400 may be employed to receive a media content search request from an end user (e.g. end user terminal device 310), transmit the media content search request to a plurality of service provider servers (e.g. service provider servers 350), receive responses from the plurality of service provider servers, and transmit the ranked responses to the requesting end user.

A search request collecting function 410 may receive an end user media content search request (e.g. a hypertext transfer protocol (HTTP) request from an end user terminal device 310). An end user media content search request may comprise a variety of forms, such as a key word based media content title search, a request for a most popular media content without a classification, and/or a request for a most popular media content with classification (e.g. within a genre, within a release date range, media content with a specified monetization method, etc.). The search request collecting function 410 may process the end user media content search request, forward search data related to the requested media content to a search request distribution function 430, and/or forward end user data and/or end user terminal data to an end user information function 420.

An end user information function 420 may receive user information, which may be associated with an end user and/or an end user terminal device that submitted a media content search request (e.g. from an end user terminal device 310). Such end user information may be received from a search request collecting function 410. End user information may comprise information regarding the end user's terminal device (e.g. processing power, storage availability, screen resolution, etc.), information regarding the end user's available network bandwidth, information regarding the end user's service provider subscription status, and/or information regarding whether the end user may be willing to accept a pay-per-use media content response. The end user information may be received numerous ways, for example the end user information may be automatically detected by a component in communication with a unified portal 400, automatically detected by the unified portal 400, may be submitted by the end user, may be maintained as a data profile at the unified portal 400, may be maintained at the end user terminal, and/or may be maintained at an intermediate component, and/or a combination thereof. End user information may comprise data such as a device type, a device processing speed, an available memory, an available screen size, and/or an available screen resolution. End user information regarding an end user's available network bandwidth may comprise data such as an end user's subscription network bandwidth rate, whether an end user's network bandwidth subscription includes a burst mode capability, and/or whether an end user may be willing to pay for a temporary boost in network bandwidth to stream higher bandwidth requiring media content. End user information function 420 may process the end user information and forward the end user information to a service provider response filtering, ranking, and/or aggregating function 450.

A search request distribution function 430 may receive an end user media content search request (e.g. via the search request collecting function 410) and may distribute the end user media content search request search data to a plurality of service providers (e.g. plurality of service providers 350). A search request distribution may be sent to any service provider in communication with the unified portal architecture 400 and/or may be sent to service providers provisioned by an end user. Such provisioning may be received by the search request distribution function 430 in a variety of ways. For example, an end user may include a list of service providers to search in the end user's media content search request, which may be received by the search request collecting function 410. In another embodiment, provisioning information may be received in a profile associated with the end user. Such profile may be created by the end user, stored on the unified portal 400, and/or stored on the end user terminal device.

A service provider response collecting function 440 may receive search request responses from a plurality of service providers (e.g. plurality of service providers 350). Such service provider search request responses may comprise unified resource locators (URLs) for available media content. Such URLs may comprise data including media content quality offerings (e.g. SD or HD), data indicating whether a service provider offers CDN dynamic site acceleration, data indicating service provider monetization methods (e.g. subscription-based, pay-per-use, free with ads, free without ads, etc.) A service provider response collecting function 440 may forward collected service provider responses to a service provider response filtering, ranking, and/or aggregating function 450.

A service provider response filtering, ranking, and/or aggregating function 450 may receive end user information from an end user information function 420, receive service provider server media content search responses from a service provider response collecting function 440, and may filter, rank, and/or aggregate service provider server responses based on end user information to enhance the end user's QoE. A service provider response filtering, ranking, and/or aggregating function 450 may filter out service provider responses. For example, service provider responses may be filtered out if such responses do not correspond to the end user media content search request, do not correspond to the end user information, and/or may exceed the end user's available network bandwidth. Also, a service provider response filtering, ranking, and/or aggregating function 450 may aggregate the filtered service provider responses for ranking. A service provider response filtering, ranking, and/or aggregating function 450 may rank the service provider server responses to enhance the end user's QoE, and/or may match a service provider to the end user terminal device. In an embodiment, ranking may be based upon any combination of factors, such as key word matching, media popularity among other end users, media genre, an end user's terminal capability, available network bandwidth, and/or a requested media monetization method. In another embodiment, a service provider response filtering, ranking, and/or aggregating function 450 may rank service provider responses by assigning a QoE ranking value to each QoE factor. A total QoE value for each service provider response may be calculated based upon the QoE ranking values associated with each service provider response. A ranked service provider response list may be derived by listing the service provider responses in descending order from a service provider response with a highest total QoE value to a service provider response with a lowest total QoE value. Once service provider responses are ranked, the service provider response filtering, ranking, and/or aggregating function 450 may submit ranked responses and/or a ranked service provider response list to an end user. A service provider response filtering, ranking, and/or aggregating function 450 may then forward the filtered, ranked, and/or matched service provider search request responses to the end user (e.g. to a user terminal 410), for example, via an HTTP response. The forwarded responses may be limited to responses related to the matched service provider or may comprise all ranked responses.

Figure 5:
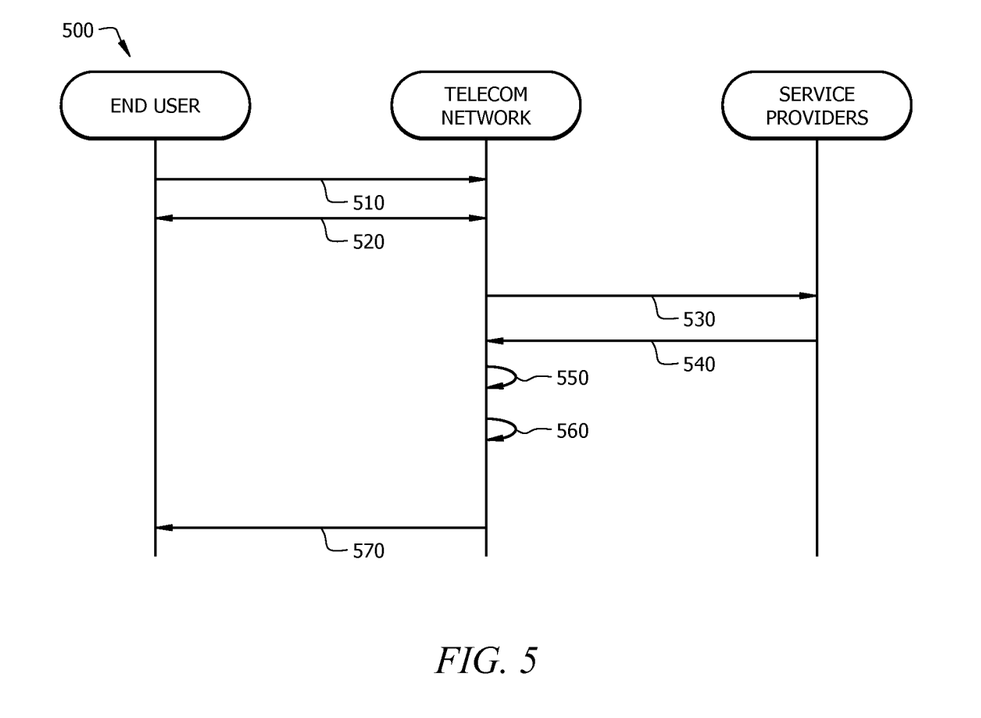
FIG. 5 is a signaling diagram of an embodiment of a method of responding to a media content request.

FIG. 5 is a signaling diagram of an embodiment of a method 500 of responding to a media content request. Method 500 may be employed by an end user to request media content from a plurality of service provider servers via a telecom operator network, (e.g. end user terminal device 310, service provider servers 350, and terminal operator network 320, respectively). At step 510 an end user may submit a media content search request to a telecom network via a unified portal, such as unified portal 400. At step 520, information about an end user terminal device bandwidth, and/or subscription status may be collected by the unified portal. The end user information may be gathered in a number of ways. In one embodiment, an end user may input end user and/or end user terminal device information into an end user profile that may be used in determining QoE. Alternatively, a telecom operator and/or an end user terminal device may automatically detect information about an end user terminal device when a media content search request is submitted. Information about an end user's available network bandwidth may also be collected by the telecom network. In one embodiment, an end user may input their network bandwidth subscription status into an end user profile that may subsequently be used in determining QoE. Alternatively, a telecom operator may estimate general information about an end user's network bandwidth when a media content search request is submitted.

At step 530, a telecom operator may distribute an end user media content search request to a plurality of service providers. In an embodiment, a telecom operator network may distribute an end user media content search request to provisioned service providers. This provisioning may occur in numerous ways. For example, an end user profile may indicate the provisioned service providers. In another embodiment, an end user may indicate the provisioned service providers upon submitting the request. In another embodiment, the telecom operator network may distribute the end user media content search request to all service provider servers connected to the network and/or all service providers that have an agreement with the telecom operator.

At step 540, a telecom network may receive service provider server responses to the end user media content search request of step 510. These service provider responses may be received by a telecom network in various forms. In one embodiment, service provider responses may comprise URLs for available media content. In another embodiment, the URLs may further comprise information about the available media content (e.g. resolution, file size, etc.). At step 550, a telecom operator network may aggregate, filter, and/or rank service provider responses based upon maximizing an end user's QoE. QoE may be determined based on a plurality of factors. In an embodiment, QoE may be determined based on at least one factor, such as search request key word matching, requested media content popularity among end user's previously requesting that media content, and/or a requested media content's genre. QoE factors may further comprise an end user's terminal capability, an end user's available bandwidth, a requested media monetization method, and/or an end user specified preferred monetization method, such as a pay-per-view media content, media content from a service provider the end user may be subscribed to, free media content with advertisements, and/or combinations thereof. At step 560, a telecom operator network may optionally match an end user terminal device to a service provider that may provide the greatest overall end user QoE. An end user QoE may be determined based on factors substantially similar to factors discussed in step 550. At step 570, the telecom operator network may return the search provider server response(s) (e.g. via a unified portal) to the end user. The returned service provider search response(s) may be for a matched service provider server and/or for a plurality of service provider servers.

Figure 6:
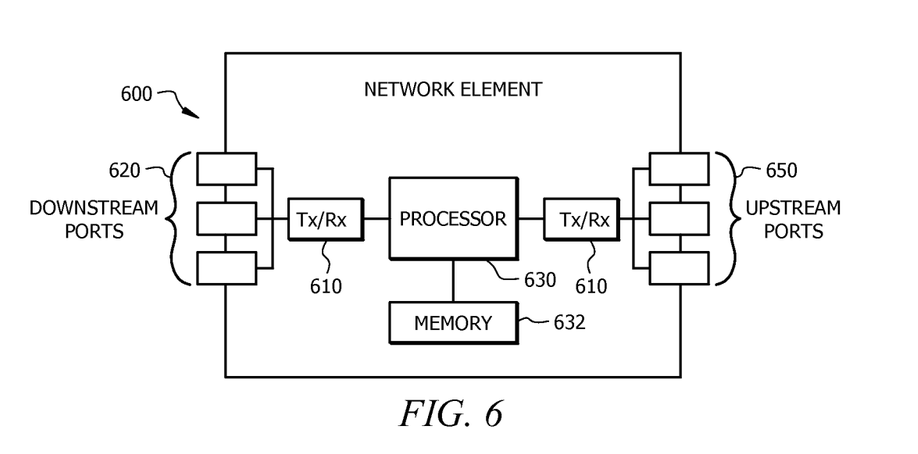
FIG. 6 is a schematic diagram of an embodiment of a NE.

FIG. 6 is a schematic diagram of an embodiment of a network element (NE) 600, which may comprise an end user terminal 310, a telecom network 320, a unified portal 330 and/or 400, a telecom CDN 340, and/or a service provider server 350. One skilled in the art will recognize that the term NE encompasses a broad range of devices of which NE 600 is merely an example. NE 600 is included for purposes of clarity of discussion, but is in no way meant to limit the application of the present disclosure to a particular NE embodiment or class of NE embodiments. At least some of the features/methods described in the disclosure, for example method 500 of ranking service provider responses to media content search requests, may be implemented in whole or in part in a network apparatus or component such as an NE 600. For instance, the features/methods in the disclosure may be implemented using hardware, firmware, and/or software installed to run on hardware. The NE 600 may be any device that transports frames through a network, e.g., a switch, router, bridge, server, a client, etc. As shown in FIG. 6, the NE 600 may comprise transceivers (Tx/Rx) 610, which may be transmitters, receivers, or combinations thereof. A Tx/Rx 610 may be coupled to plurality of downstream ports 620 for transmitting and/or receiving frames from other nodes, and a Tx/Rx 610 coupled to plurality of upstream ports 650 for transmitting and/or receiving frames from other nodes. A processor 630 may be coupled to the Tx/Rxs 610 to process the frames and/or determine which nodes to send frames to. The processor 630 may comprise one or more multi-core processors and/or memory devices 632, which may function as data stores, buffers, etc. Processor 630 may be implemented as a general processor or may be part of one or more application specific integrated circuits (ASICs) and/or digital signal processors (DSPs). The downstream ports 620 and/or upstream ports 650 may contain electrical and/or optical transmitting and/or receiving components. NE 600 may or may not be a routing component that makes routing decisions.

It is understood that by programming and/or loading executable instructions onto the NE 600, at least one of the processor 630, downstream ports 620, Tx/Rxs 610, memory 632, and/or upstream ports 650 are changed, transforming the NE 600 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s)

and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.6, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network element (NE) in a telecommunications operator network, the NE comprising:
   a plurality of ports configured to communicate data between an end user terminal and a plurality of media content service providers, each positioned outside of the telecommunications operator network; and
   a processor coupled to the plurality of ports and configured to:
      receive, via the plurality of ports, a single terminal search request and a requested media monetization method from the end user terminal requesting media content;
      distribute, via the plurality of ports, the single terminal search request to the plurality of media content service providers based on the single terminal search request in order to search for the requested media content at the plurality of media content service providers;
   receive, via the plurality of ports, a plurality of search responses from the plurality of media content service providers, wherein each search response identifies media available to a responding media content service provider and relevant to the single terminal search request;
   filter the plurality of search responses from the plurality of media content service providers to remove search responses that are incompatible with a quality of experience (QoE) of an end user;
   rank the filtered of the plurality of search responses based on enhancing the QoE of the end user and the requested media monetization method;
   assign a QoE ranking value to each QoE factor;
   calculate a total QoE value for each filtered search response, wherein the total QoE value is based upon the QoE ranking value associated with the each filtered search response; and
   derive a ranked search response list, wherein the ranked search response list comprises the filtered of the plurality of search responses arranged in a descending order from a highest of the total QoE values to a lowest of the total QoE values.

2. The NE of claim 1, wherein the QoE of the end user is based on at least one QoE factor, and wherein the each least one QoE factor comprises an end user terminal capability.

3. The NE of claim 2, wherein the each least one QoE factor further comprises an end user available network bandwidth.

4. The NE of claim 3, wherein the requested media monetization method is selected from subscription-based, pay-per-use, free with ads, and free without ads.

5. The NE of claim 4, wherein the each least one QoE factor further comprises at least one of a search request key word matching, a requested media popularity among a plurality of prior end users, and a requested media genre.

6. The NE of claim 1, wherein the requested media content search are distributed to the plurality of media content service providers that are provisioned by the end user.

7. The NE of claim 6, further comprising a memory coupled to the processor, and wherein the memory stores a user profile associated with the end user.

8. The NE of claim 7, wherein the user profile indicates the provisioned the plurality of media content service providers.

9. A method implemented in a network element (NE) positioned in a telecommunications operator network, the method comprising:

a plurality of ports configured to communicate data between an end user terminal and a plurality of media content service providers; and receiving a single terminal search request and a request media monetization method from the end user terminal, the single terminal search request requesting media content;

distributing the single terminal search request to the plurality of media content service providers in order to search for the requested media content at the plurality of media content service providers, wherein the plurality of media content service providers are each positioned outside of the telecommunications operator network;

receiving a search response and data associated with the requested media content from each media content service provider, wherein each search response identifies media content relevant to the single terminal search request and stored outside of the telecommunications operator network;

filter a search responses from the plurality of media content service providers to remove search responses that are incompatible with a quality of experience (QoE) of an end user; and rank the filtered of the search responses based on enhancing the QoE of the end user and the requested media monetization method;

assign a QoE ranking value to each QoE factor;

calculate a total QoE value for each filtered search response, wherein the total QoE value is based upon the QoE ranking value associated with the each filtered search response; and derive a ranked search response list, wherein the ranked search response list comprises the filtered of the search responses arranged in a descending order from a highest of the total QoE values to a lowest of the total QoE values.

accumulating the search responses and media content data.

10. The method of claim 9, wherein the data associated with the requested media content comprises a media resolution, a media bit rate, a monetization method associated with the media content, a media genre, a media title, a media popularity, or combinations thereof.

11. The method of claim 9, further comprising the filtering of the search responses to remove search responses that are incompatible with an end user quality of experience (QoE), a terminal capability, an available network bandwidth, or a combination thereof.

12. The method of claim 11, further comprising the ranking of the search responses based on an end user QoE to create a ranked order of search responses.

13. The method of claim 12, further comprising aggregating the search responses to create a list of search responses, wherein the list of search responses comprises an order, and wherein the order is based upon the ranking of the search responses.

14. The method of claim 13, further comprising forwarding the list of search responses to the end user terminal.

15. The method of claim 9, further comprising matching one of the plurality of media content service providers to the end user terminal based upon on the end user quality of experience (QoE).

* * * * *

UNITED STATES PATENT AND TRADEMARK OFFICE
CERTIFICATE OF CORRECTION

PATENT NO. : 9,514,229 B2  
APPLICATION NO. : 13/862328  
DATED : December 6, 2016  
INVENTOR(S) : Li et al.

Page 1 of 1

It is certified that error appears in the above-identified patent and that said Letters Patent is hereby corrected as shown below:

On the Title Page

Left Column; beneath (71) Applicant: should read:
(72) Inventors: Hongbing Li, Skillman, NJ (US); Yue Chen, Fremont, CA (US); Hong Heather Yu, West Windsor, NJ (US)

Signed and Sealed this
Twenty-third Day of May, 2017

Michelle K. Lee
*Director of the United States Patent and Trademark Office*